United States Patent [19]

Barnes et al.

[11] Patent Number: 5,742,632
[45] Date of Patent: Apr. 21, 1998

[54] HO:LULF AND HO:TM:LULF LASER MATERIALS

[75] Inventors: Norman P. Barnes, Yorktown, Va.; Clyde A. Morrison, Wheaton, Md.; Elizabeth D. Filer; Mahendra G. Jani, both of Poquoson, Va.; Keith E. Murray; George E. Lockard, both of Newport News, Va.

[73] Assignee: The United States of America as represented by the Administrator of the National Aeronautics and Space Administration, Washington, D.C.

[21] Appl. No.: 524,861

[22] Filed: Sep. 7, 1995

[51] Int. Cl.$^6$ ............................................. H01S 3/14
[52] U.S. Cl. ..................... 372/68; 372/10; 372/18; 372/94; 372/41
[58] Field of Search .................... 372/68, 69, 66, 372/39, 41, 94, 10, 18

[56] References Cited

U.S. PATENT DOCUMENTS

| | | | |
|---|---|---|---|
| 4,578,793 | 3/1986 | Kane et al. | 372/94 |
| 4,648,094 | 3/1987 | McCollum et al. | 372/41 |
| 4,974,230 | 11/1990 | Hemmati . | |
| 4,987,575 | 1/1991 | Alfano et al. | 372/39 |
| 5,287,378 | 2/1994 | Bowman . | |
| 5,289,482 | 2/1994 | Esterowitz et al. . | |
| 5,420,878 | 5/1995 | Kane et al. | 372/41 |

OTHER PUBLICATIONS

Filer, E. D., et al., "YLF Isomorphs fo Ho and Tm Laser Application", Optical Society of America, OSA Proceedings on Advanced Solid State Laser, vol. 20, 1994, pp. 127–130.
Harris, I. R. et al., "the Relationships between crystal growth bbehavior and constitution in the systems LiF-LuF3, LiF-ErF3, and Lif-YF3", Journal of Materials Science, 1983, pp. 1235–1243.
Cockayne, J.G. et al., "The czochralski grpwth and laser characteristics of Li(Lu,Er,Tm,Ho)F4 scheelite single crystals", Journal of Crystal Growth, 1981, pp. 407–413.

Primary Examiner—Leon Scott, Jr.
Attorney, Agent, or Firm—Robin W. Edwards

[57] ABSTRACT

A laser host material LuLF (LuLiF$_4$) is doped with holmium (Ho) and thulium (Tm) to produce a new laser material that is capable of laser light production in the vicinity of 2 µm. The material provides an advantage in efficiency over conventional Ho lasers because the LuLF host material allows for decreased threshold and upconversion over such hosts as YAG and YLF. The addition of Tm allows for pumping by commonly available GaAlAs laser diodes. For use with flashlamp pumping, erbium (Er) may be added as an additional dopant. For further upconversion reduction, the Tm can be eliminated and the Ho can be directly pumped.

21 Claims, 10 Drawing Sheets

HO:LULF AND HO:TM:LULF LASER MATERIALS

ORIGIN OF THE INVENTION

The invention described herein was jointly made by employees of the United States Government and during the performance of work under NASA contracts and is subject to provisions of Section 305 of the National Aeronautics and Space Act of 1958, as amended, Public Law 85–568 (72 Stat. 435; 42 USC 2457), and 35 USC 202, respectively. In accordance with 35 USC 202, the contractor elected not to retain title.

BACKGROUND OF THE INVENTION

1. Field of the Invention

The invention relates generally to the field of lasers and laser materials. It relates specifically to laser materials for the production of light having a wavelength of approximately 2 μm.

2. Description of the Related Art

In solid state lasers, a light emitting element is added as a dopant to a host compound. A common host compound is YAG (yttrium aluminum garnet). There are several other known compounds that may act as hosts such as YLF (yttrium lithium fluoride), GGG (gadolinium gallium garnet), YSGG (yttrium scandium gallium garnet) and many others. A wide variety of dopants are known that may be employed in the production of laser light including chromium, neodymium, erbium, holmium, thulium and titanium.

Esterowitz, et. al. (U.S. Pat. No. 5,289,482, herein incorporated by reference) and Hemmati (U.S. Pat. No. 4,974,230, herein incorporated by reference) disclose that holmium (Ho) may be used in combination with thulium (Tm) as dopants in solid state lasers to generate light in the 2 μm range.

It is desirable in choosing a laser material to reduce the threshold of the resulting laser system and upconversion rate, thus increasing the efficiency of the laser. The threshold is essentially the amount of input energy required to cause the material to lase. Threshold depends on the thermal occupation factors of the upper and lower laser levels, the transition probabilities associated with the particular transition, and the losses in the laser resonator.

Such known materials as YAG and YLF have high thresholds. Most Ho:Tm lasers operate on one of the Ho $^5I_7$ to $^5I_8$ transitions. These materials are quasi-four level lasers, which means that the ground manifold contains the lower laser level. High thresholds, such as are found in YLF and YAG, are due to two factors: the thermal occupation of the lower laser level and the effective stimulated emission cross section. There are two important advantages to co-doping the material with thulium. One is the resulting compatibility with GaAlAs laser diode pumping; GaAlAs laser diodes are widely available. The other is that, with present GaAlAs laser diodes, thulium allows for more efficient pumping than with holmium alone.

A discussion of the theory of LuLiF$_4$ (LuLF, herein) lasers may be found in Filer, et. al., "YLF Isomorphs for Ho and Tm Laser Applications" OSA Proceedings on Advanced Solid State Lasers, 1994, Vol 20, Tso Yee Fan and Bruce H. T. Chai (eds).

Bowman, et. al. (U.S. Pat. No. 5,287,378, herein incorporated by reference) discloses a holmium quasi-two level laser.

SUMMARY OF THE INVENTION

It is an object of the present invention to provide a laser material for the production of 2 μm laser light.

It is another object of the present invention to provide a laser material that has a higher efficiency at room temperature than known laser materials such as Ho:Tm:YAG and Ho:Tm:YLF.

It is a further object of the present invention to provide a laser material that has lower thresholds at room temperature than known laser materials such as Ho:Tm:YAG and Ho:Tm:YLF.

It is a further object of the present invention to provide a laser material that is compatible to laser diode pumping using currently available GaAlAs laser diodes.

To achieve the forgoing objects, a material is provided comprising Ho:Tm:LuLiF$_4$ (Ho:Tm:LuLF). Quantum mechanical modeling was used to show that in this material the lower laser level would have a low thermal occupation and that there would be a high effective stimulated emission cross section, thereby decreasing the threshold and increasing efficiency over such materials as YLF and YAG. The use of Tm allows for the ability to pump the laser with GaAlAs laser diodes. Efficiency is also increased as a result of a lower upconversion rate.

Absorption and emission spectra, as well as lifetime as a function of the pump level were taken to characterize Ho:Tm:LuLF. Laser performance data were also gathered.

As described above, the Ho:Tm:LuLF may be used in diode pumped lasers. In addition, further doping with erbium (Er) may be employed to provide a laser material that may be pumped with a flashlamp. In this case, the Er would be utilized in relatively high concentrations to achieve efficient absorption of flashlamp radiation. Also, the upconversion losses could be reduced even further by the elimination of the Tm accompanied by direct pumping of the Ho.

DESCRIPTION OF THE PREFERRED EMBODIMENTS

The laser material of the present invention is a LuLF compound doped with Ho and Tm. LuLF is an isomorph of YLF, a compound that is known to function as a laser host compound. Ho and Tm are known dopants for use in laser materials for two micrometer laser radiation.

Figure 1:
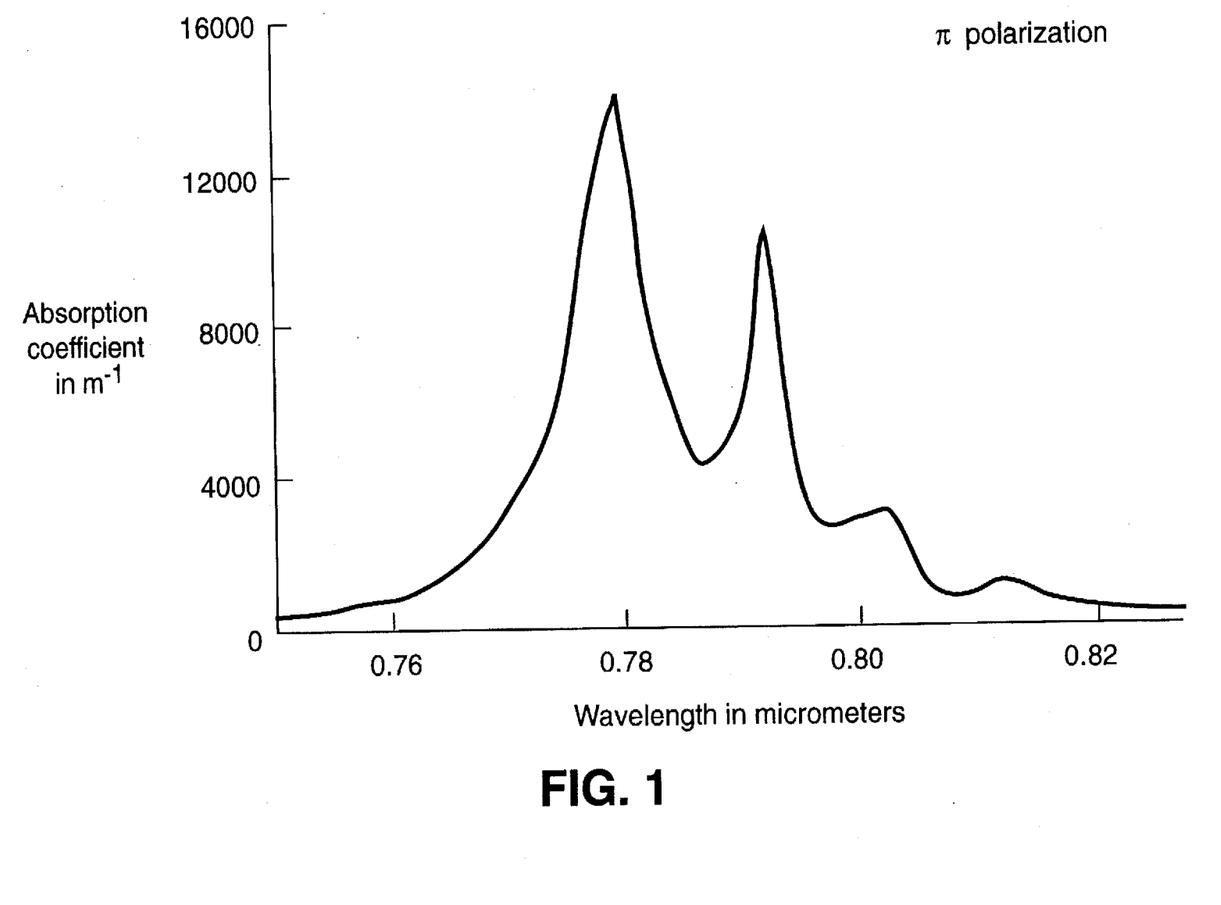
FIG. 1 shows absorption spectra for π polarization of Tm:LuLF measured in the 0.8 μm region.
Figure 2:
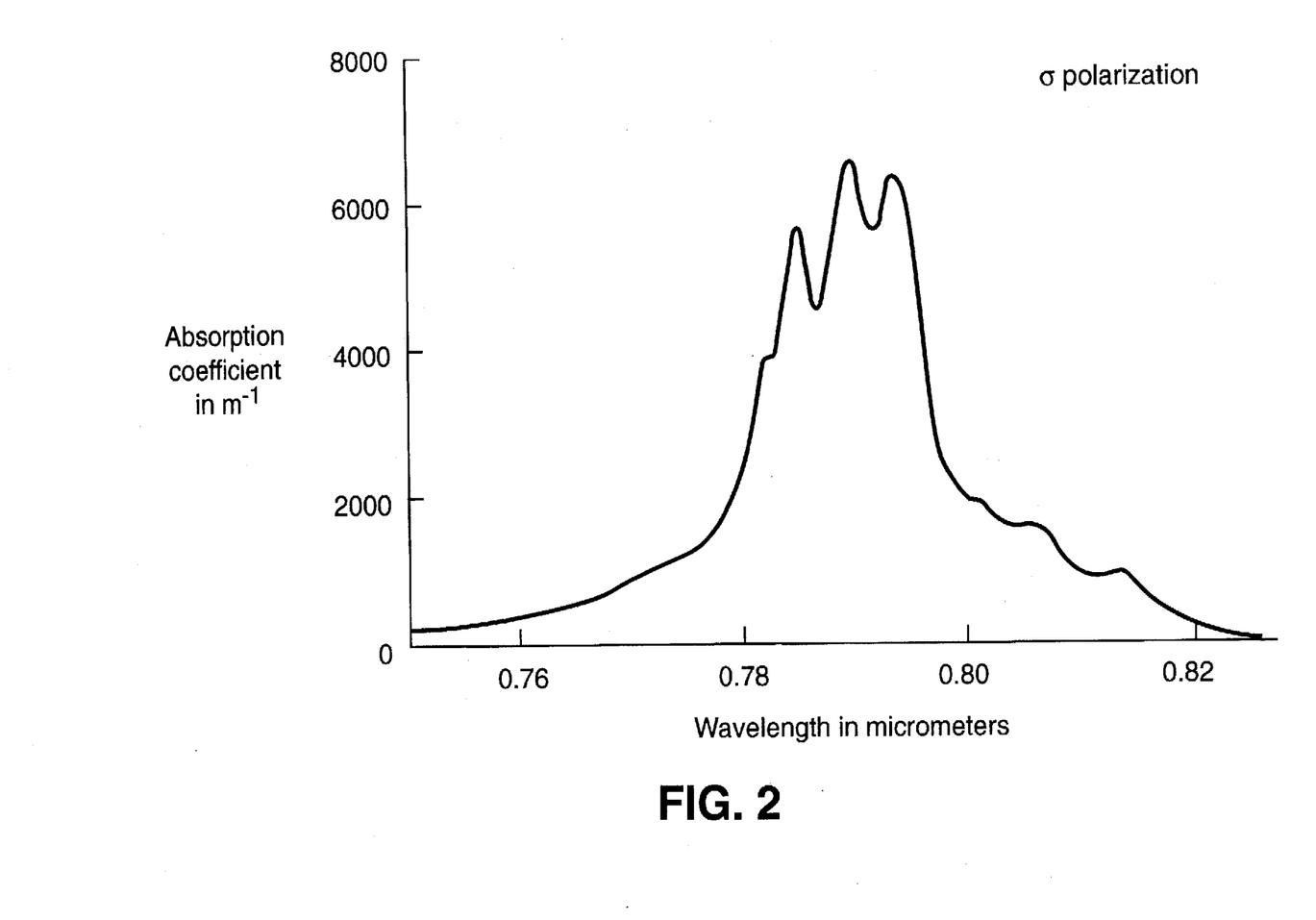
FIG. 2 shows absorption spectra for σ polarization of Tm:LuLF measured in the 0.8 μm region.
Figure 3:
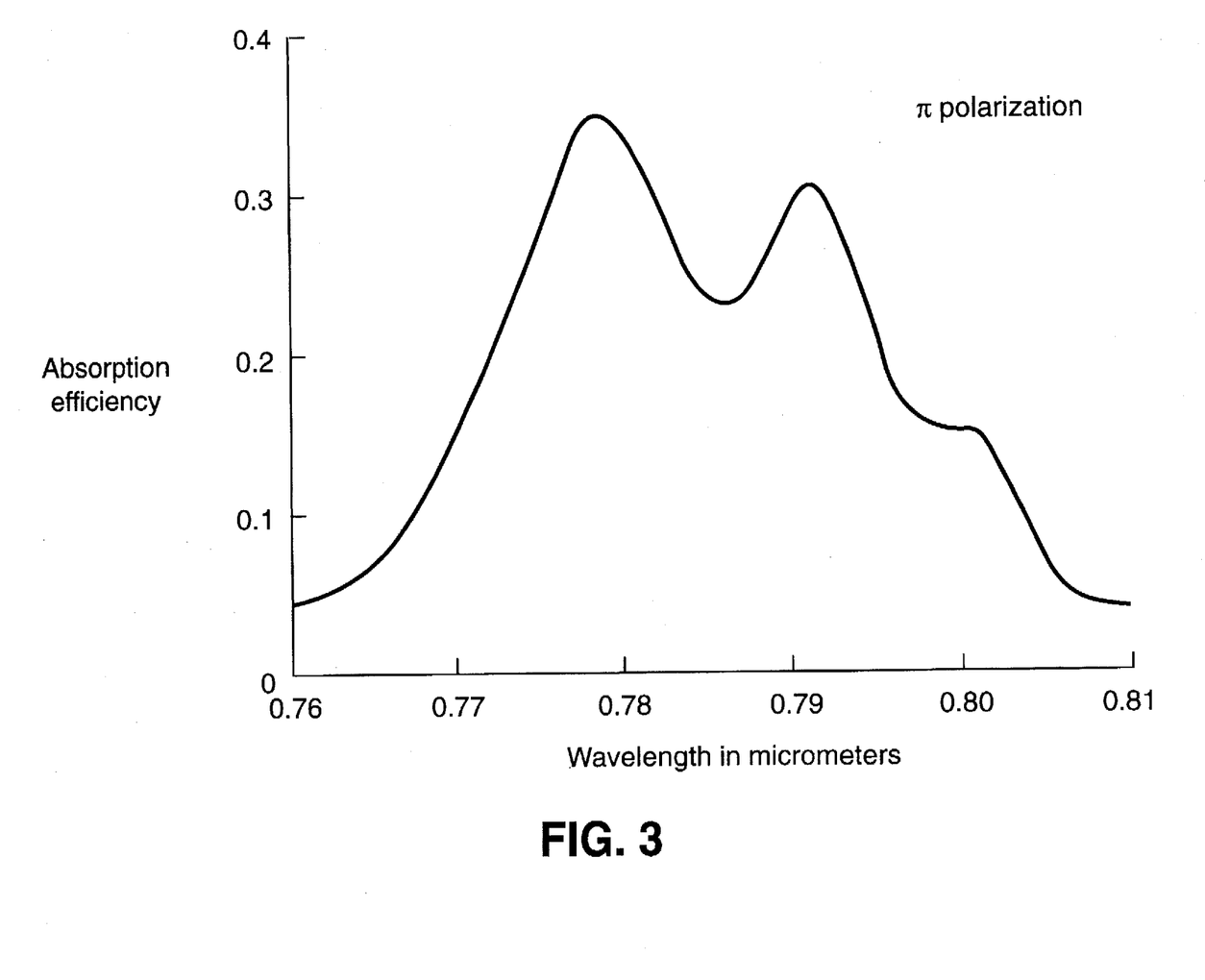
FIG. 3 shows absorption efficiency of a Ho:Tm:LuLF laser rod with a Tm concentration of 0.05 and a laser rod radius of 2.0 mm for π polarization as a function of wavelength.
Figure 4:
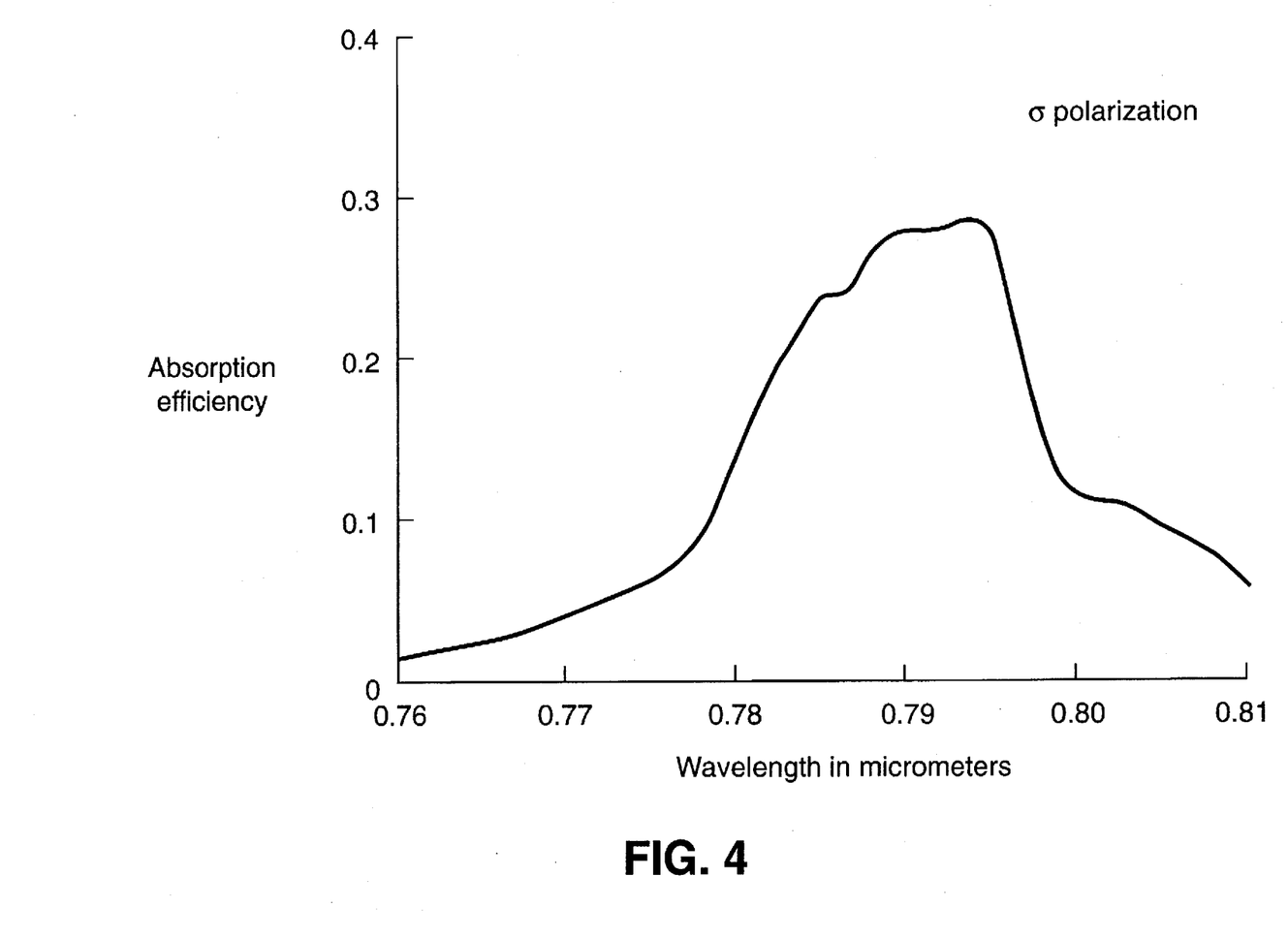
FIG. 4 shows absorption efficiency of a Ho:Tm:LuLF laser rod with a Tm concentration of 0.05 and a laser rod radius of 2.0 mm for σ polarization as a function of wavelength.

Absorption spectra for $\pi$ and $\sigma$ polarizations of Tm:LuLF, measured in the 0.8 µm region, are displayed in FIG. 1 and FIG. 2. Laser diode pumping usually involves the Tm $^3H_6$ to $^3H_4$ transition in the 0.8 µm region because of the availability of the AlGaAs laser diode arrays for pumping applications. Absorption efficiency of a Ho:Tm:LuLF laser rod with a Tm concentration of 0.05 and a rod radius of 2.0 mm is displayed as a function of center pump wavelength for the $\pi$ and $\sigma$ polarizations in FIG. 3 and FIG. 4. Peak absorption efficiency for the $\pi$ polarization occurs around 0.779 µm while the peak absorption efficiency for the $\sigma$ polarization occurs around 0.793 µm. For unpolarized pump radiation, a reasonable compromise for the center pump wavelength is 0.792 µm where nearly equal absorption for both polarizations occurs.

Lifetime of the Ho $^5I_7$ manifold for a lightly doped sample of Ho:LuLF was measured to be 16.9 msec. A sample of LuLF with Ho only at a concentration of 0.005 was used for these measurements. Excitation of the Ho $^5I_7$ was accomplished with a Co:MgF$_2$ laser operating at 1.94 µm. Fluorescence decay of this manifold could be well characterized by a single exponential decay curve.

Figure 5:
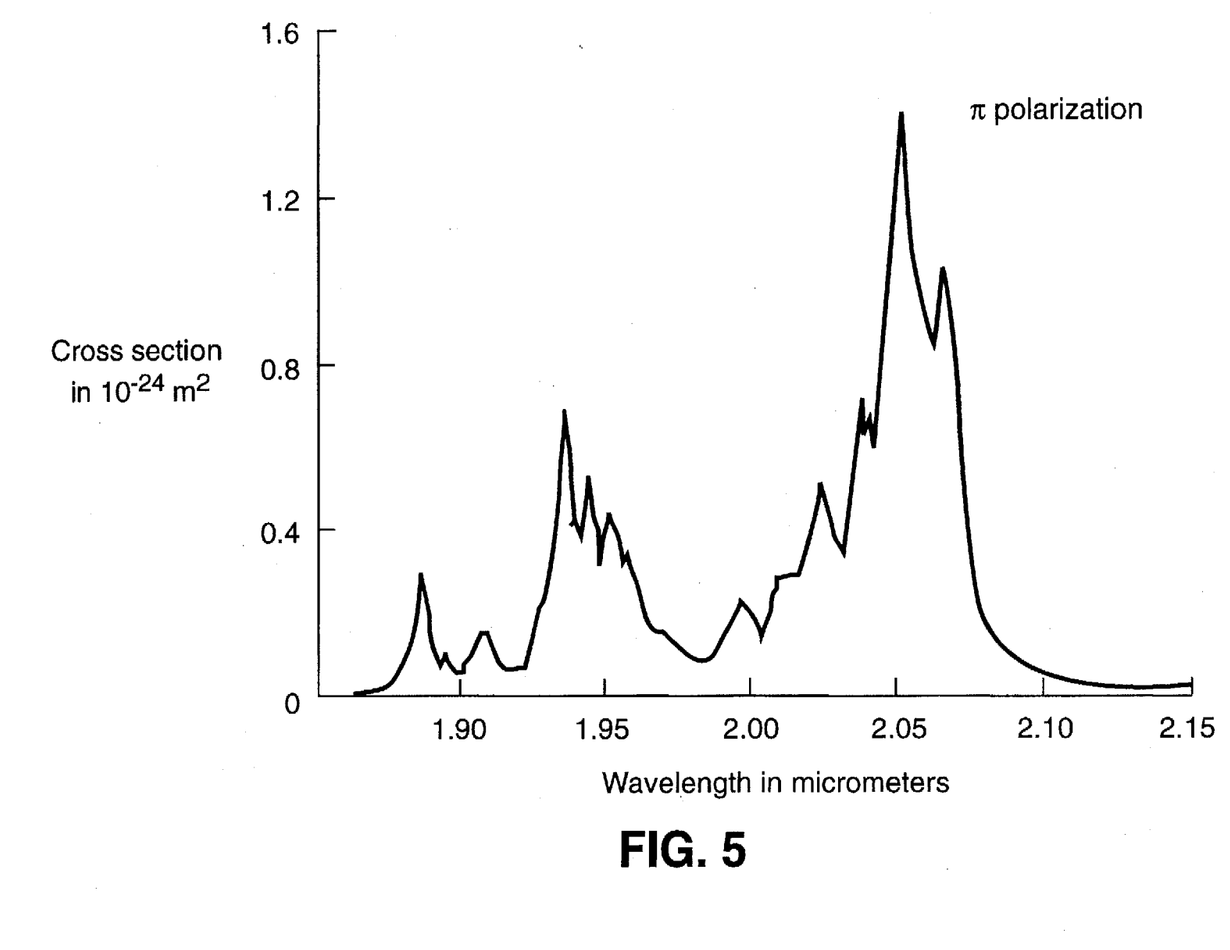
FIG. 5 shows the effective stimulated emission cross section for π polarization of Ho:LuLF as a function of wavelength.
Figure 6:
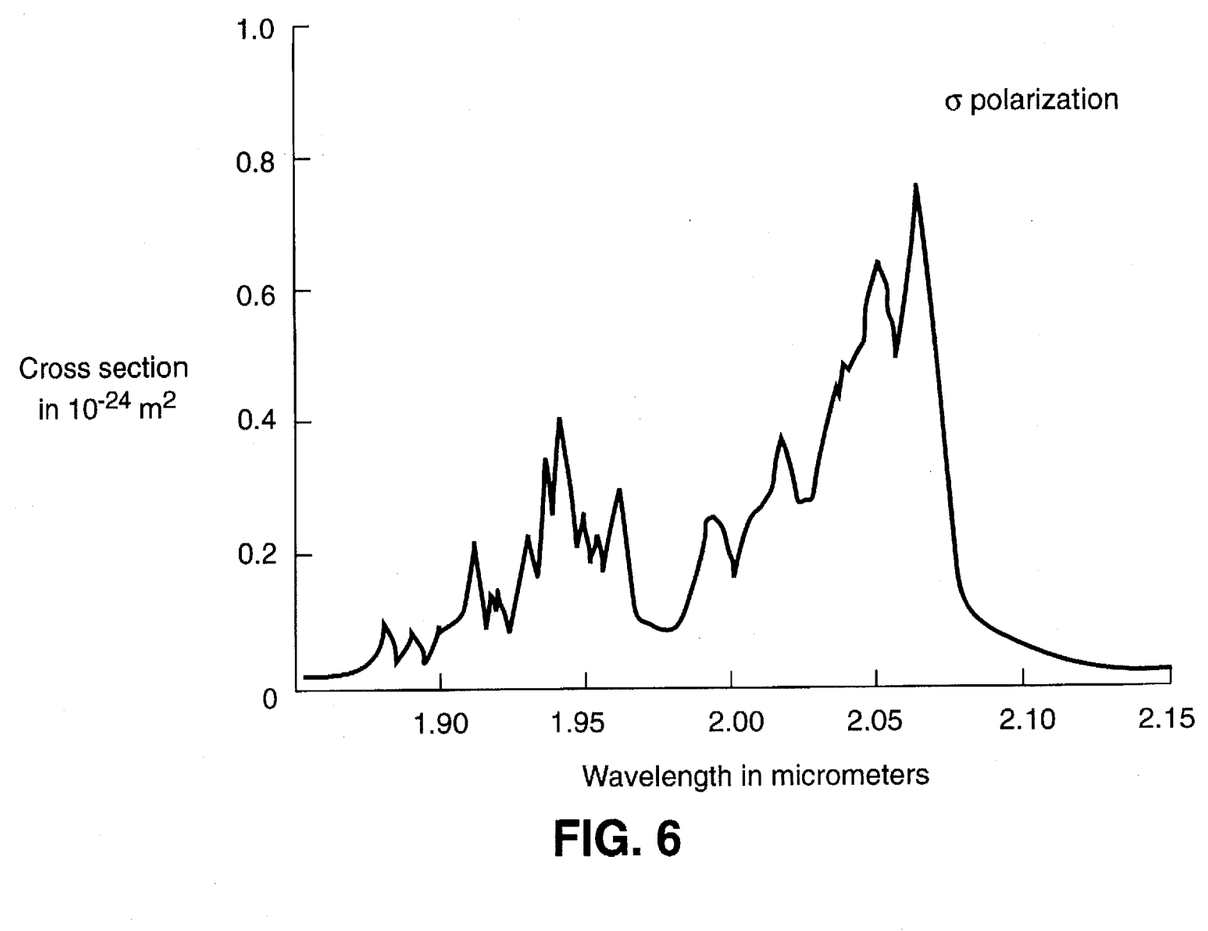
FIG. 6 shows the effective stimulated emission cross section for σ polarization of Ho:LuLF as a function of wavelength.

Emission spectra were taken with the lightly doped Ho:LuLF sample to determine the effective stimulated emission cross section as a function of wavelength. For these measurements, the same lightly doped Ho:LuLF sample was used. Both $\pi$ and $\sigma$ polarized emission spectra were taken between 1.85 µm and 2.15 µm. Combining these measurements with the measured lifetime allowed the effective stimulated emission cross section to be calculated, as displayed in FIG. 5 and FIG. 6. A peak in the effective stimulated emission cross section for the $\pi$ polarization occurs at 2.053 µm while a peak in the effective stimulated cross section for the $\sigma$ polarization occurs at 2.065 µm. By measuring the mass and volume of a sample of the material, the density of the material was determined to be 6198 kg/m$^3$.

A variation of the angle of minimum deviation method was used to measure the refractive indices of LuLF. Lightly doped Ho:LuLF was fabricated into a right angle prism with an apex angle of 30.2 degrees and the long leg was silver coated to increase the reflectivity. At 0.543 µm, the refractive indices of LuLF were 1.464 and 1.488 for the ordinary and extraordinary refractive indices, respectively.

Figure 7A:
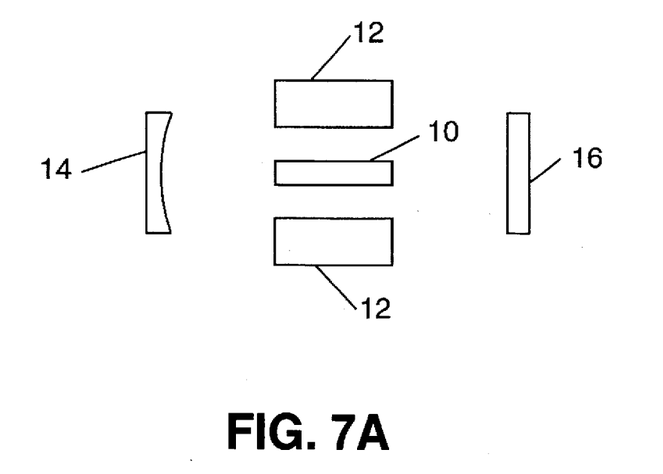
FIG. 7A is a drawing of a laser configuration for a diode pumped laser according to the present invention.

One example of the practice of the present invention is shown in FIG. 7A. A crystal of Ho:Tm:LuLF, the laser material, 10, is placed in a laser resonator. One side of the laser resonator is formed by a reflective mirror 14. A reflective mirror 14 having a high reflectivity, i.e., 0.99 reflectivity or above, is desirable. The other side is an output mirror 16. The output mirror 16 is selected for maximum efficiency. The radii of curvature for mirror 14 and mirror 16 are selected so that a stable output, i.e., repeatable beam characteristics such as energy or beam quality, is achieved. This may require that a concave surface be ground on one or both of the mirror 14 and mirror 16 surfaces. Laser diode arrays 12 are arranged to pump the laser material 10. It is desirable that the laser diodes are GaAlAs laser diodes; however, other laser diodes such as InGaAsP could be used. The emission from the laser diode arrays 12 is matched to the absorption features of the laser material. This choice provides an appropriate wavelength of laser light for pumping the Ho:Tm:LuLF laser material.

Figure 8A:
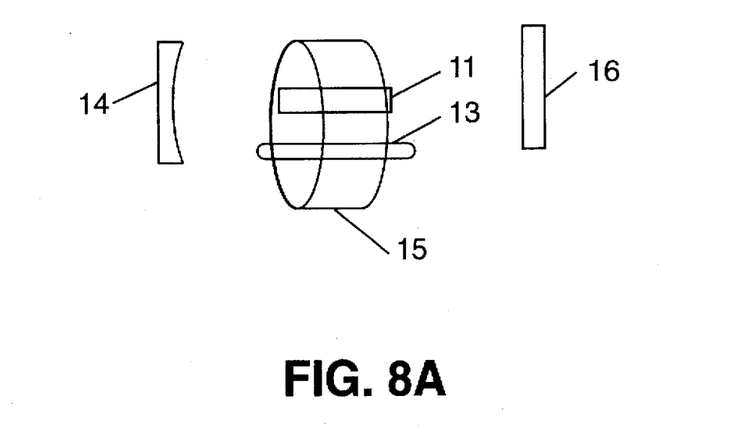
FIG. 8A is a drawing of a laser configuration for a flashlamp pumped laser according to the present invention.

Making reference to FIG. 8A, an alternative embodiment is shown. A flashlamp 13 is used to pump the laser material, Ho:Tm:Er:LuLF, 11. The flashlamp 13 is usually selected to approximately match the length of the laser rod 11 and to be approximately the same or slightly smaller diameter than the diameter of the laser rod 11. The laser material 11 is within a laser resonator. One side of the laser resonator is formed by a reflective mirror 14. A reflective mirror 14 having a high reflectivity, i.e., 0.99 reflectivity or above, is desirable. The other side is an output mirror 16. As in the diode pumped configuration, the output mirror 16 is selected for maximum efficiency and the radii of curvature for mirror 14 and mirror 16 are selected so that a stable output, i.e., repeatable beam characteristics such as energy or beam quality, is achieved. The flashlamp emits radiation over a large solid angle. In order to collect this radiation and concentrate it on the laser rod, a coupling cavity 15 is employed. An elliptical coupling cavity is shown in FIG. 8A, however many other coupling cavities are possible, such as a diffuse reflecting cavity. The addition of Er as an additional dopant makes the laser material 11 sensitive to the light produced by a Xe flashlamp.

Another embodiment of the present invention uses direct pumping of the upper laser manifold. In general, Ho:Tm lasers suffer from an effect usually referred to as upconversion. Upconversion is a process whereby an excited Ho atom in the $^5I_7$ manifold and an excited Tm atom in the $^3F_4$ manifold cooperate to excite the Ho atom to a more energetic manifold, the $^5I_5$. This often results in a loss of efficiency. While Ho:Tm:LuLF is as resistant or more resistant to this effect than other Ho:Tm laser materials, the upconversion process could be reduced even further by eliminating the Tm atoms. Since Tm is used to absorb the pump radiation, which it subsequently transfers to Ho, elimination of the Tm would require direct pumping of the Ho. The most efficacious method of accomplishing this is by direct pumping of the upper laser manifold. In this embodiment, longer wavelength laser diodes or other pump sources could be used. For example, a side-pumped scheme using laser diodes having a pump wavelength ranging from approximately 1.6 µm to approximately 2.05 µm could be used. Also, an end-pumped scheme using a Co:MgF$_2$ laser, or a Tm laser such as Tm:YAG or Tm:YAlO$_3$, which provides wavelengths ranging from approximately 1.6 µm to approximately 2.05 µm could be used.

Figure 7B:
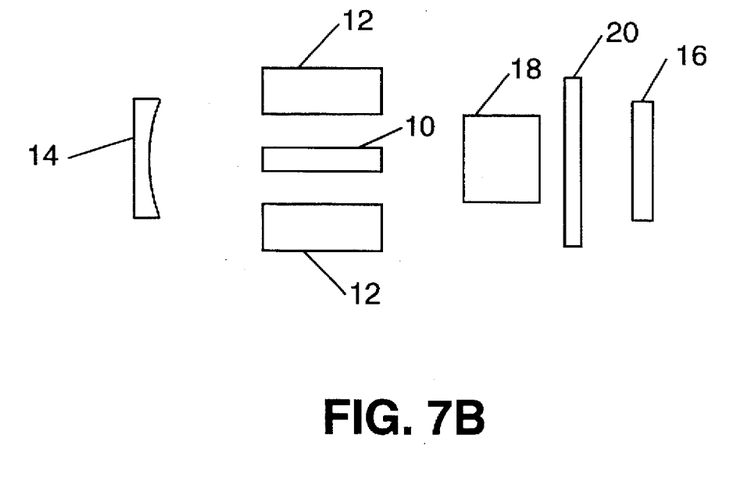
FIG. 7B is a drawing of a laser configuration for a diode pumped laser having a Q-switch and tuning element according to the present invention.
Figure 8B:
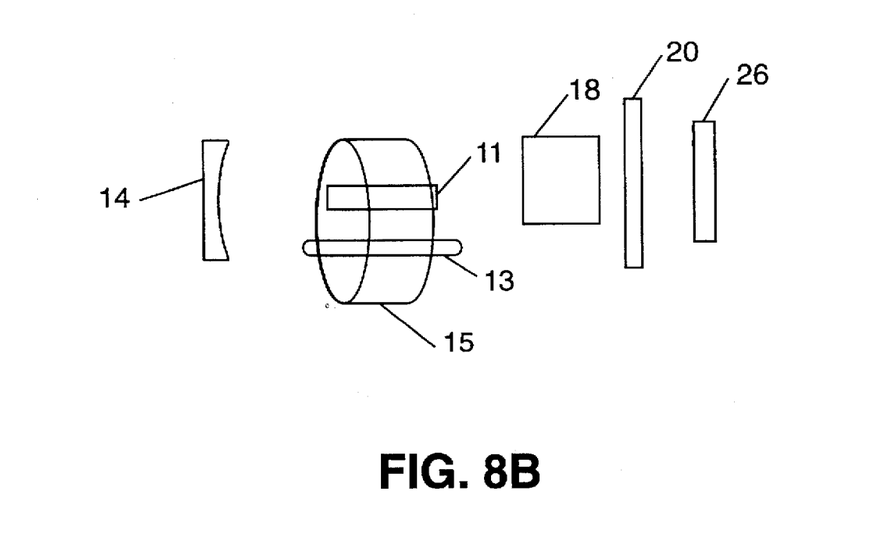
FIG. 8B is a drawing of a laser configuration for a flashlamp pumped laser having a Q-switch and tuning element according to the present invention.

Other possible embodiments of the present invention may make use of known elements to alter the characteristics of an Ho:LuLF, Ho:Tm:LuLF or Ho:Tm:Er:LuLF laser. For example, it may be desirable to make use of a Q-switch to allow for giant pulse operation of the laser. In lieu of a standing wave laser resonator, such as is formed by the use of paired mirrors in the above examples, ring resonators, formed by a system of mirrors or lenses, may be used. Continuous wave pump sources may be employed to provide a laser capable of continuous wave operation. Tuning elements may be employed to allow for production of laser light in wavelengths nearby to 2 µm. Examples of suitable tuning elements include an etalon, birefringent tuner and prism. A mode locking device may be used to achieve short, repetitive pulses. The addition of a Q-switch 18 and tuning element 20 to the diode and flashlamp configurations is shown in FIG. 7B and FIG. 8B, respectively.

A laser output energy of 79 mJ per pulse at an optical efficiency of 9.4% under normal operation was achieved using a diode pumped room temperature Ho:Tm:LuLF laser. A LuLF laser rod 4.0 mm in diameter and 10.0 mm in length, co-doped with 0.05 Tm and 0.005 Ho concentrations, was used. The laser rod was grown using the Czochralski growth process. Three laser diode arrays in a six bar stack were used to pump the Ho:Tm:LuLF. Each of the arrays was capable of producing 300W of peak power for 1.0 msec pulse lengths. The average center wavelength of the laser diode arrays was 0.795 µm. Spectral bandwidth of the laser diode arrays was 0.005 µm.

A conductively cooled laser head allowed the laser diode arrays to be in close proximity to the laser rods. Close proximity enhances efficiency. Diode arrays were positioned 120 degrees apart and were positioned to within 0.2 mm of the laser rod. Gold plated cylindrical reflectors, having a width of 1.5 mm, held the laser rod. The pulse repetition frequency was kept at 1.0 Hz.

The laser resonator was formed by a highly reflecting mirror having a 0.8 m radius of curvature and flat output mirrors having various reflectivities. The mirrors were placed 0.5 m apart and the laser rod was positioned approximately in the center of the resonator. Q-switching was accomplished by inserting a fused silica acousto-optic modulator into the resonator and applying 75W of radio frequency power. A function generator produced a 10 µs time interval when the radio frequency was turned off in order to produce a single Q-switched pulse.

Figure 9:
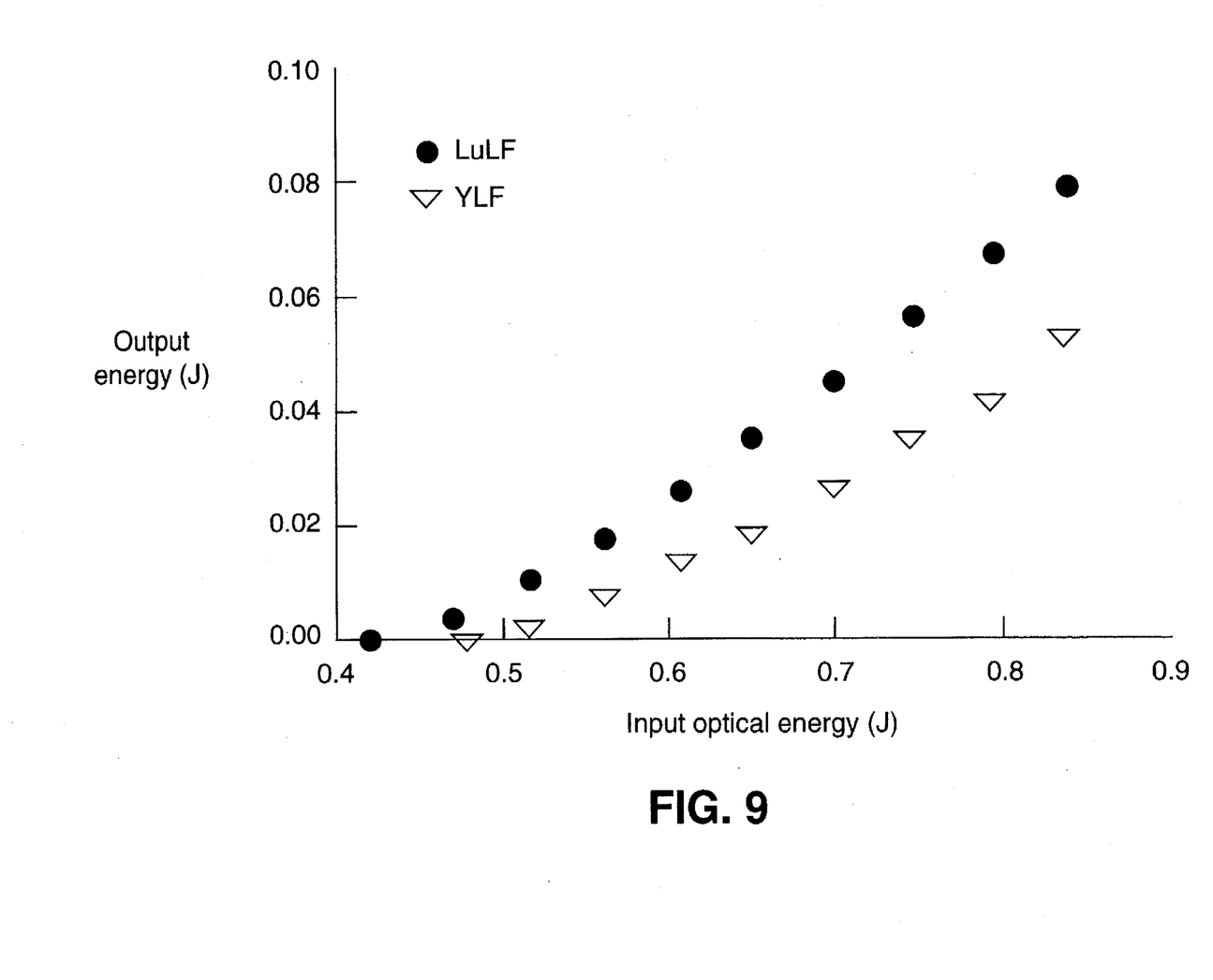
FIG. 9 is an illustration of normal mode output energy versus input optical energy for diode pumped Ho:Tm:LuLF and for diode pumped Ho:Tm:YLF for a reflectivity of 0.94.

With this experimental arrangement and operation in the normal mode, the Ho:Tm:LuLF laser produced 79 mJ of energy with an optical efficiency of 0.094. Performance of Ho:Tm:LuLF as compared to Ho:Tm:YLF for various input energies is shown in FIG. 9. The wavelength of the laser was measured to be 2.068 µm. Normal mode laser performance for various output mirror reflectivities is shown in Table 1 below.

TABLE 1

Summary of laser performance of Ho:Tm:LuLF for four different mirror reflectivities

| Mirror reflectivity | Threshold (J) | Slope Efficiency |
|---|---|---|
| 0.98 | 0.4124 | 0.1776 |
| 0.94 | 0.4547 | 0.1931 |
| 0.90 | 0.5037 | 0.1731 |
| 0.82 | 0.6194 | 0.1485 |

Figure 10:
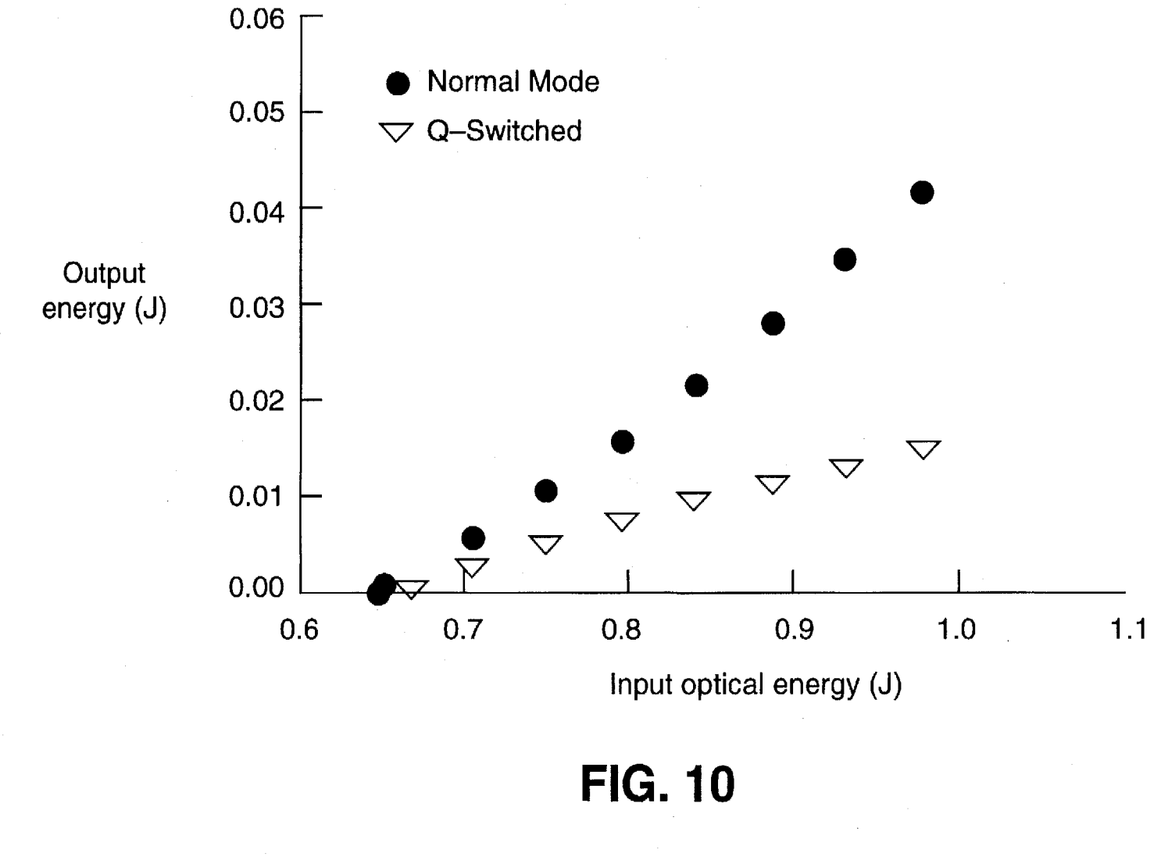
FIG. 10 is an illustration of output energy versus input optical energy for diode pumped Ho:Tm:LuLF in normal and Q-switched configurations for a reflectivity of 0.82.

Results of normal and Q-switched performance for Ho:Tm:LuLF are shown in FIG. 10. These results demonstrate the level of energy that can be extracted in single Q-switched pulses. In the normal mode performance, the RF power to the acousto-optic Q-switch is turned off. For Q-switched performance, the RF power is turned on. Maximum laser output energies of 14.7 mJ in single Q-switched pulses were obtained for an input optical energy of 0.978 J, corresponding to an optical efficiency of 0.015. The pulselengths for these 14.7 mJ pulses were approximately 150 nsec. The Q-switched laser output wavelength for Ho:Tm:LuLF was centered at 2.055 µm.

Other variations will be readily apparent to those of skill in the art. The forgoing is not intended to be an exhaustive list of modifications but rather is given by way of example. It is understood that it is in no way limited to the above embodiments, but is capable of numerous modifications within the scope of the following claims.

We claim:

1. A laser material comprising:
   a host material, the host material further comprising LuLF, the host material further being doped with a dopant, wherein the dopant is selected from the group consisting of Ho and Ho:Tm.

2. A laser system comprising:
   a laser material;
   means for pumping the laser material;
   means for producing laser resonance; and
   wherein the laser material is selected from the group consisting of Ho:LuLF and Ho:Tm:LuLF.

3. A laser system according to claim 2 wherein the laser material further comprises Ho:Tm:LuLF and the means for pumping the laser material further comprises a plurality of laser diodes.

4. A laser system according to claim 3 wherein the means for producing laser resonance further comprises a pair of opposed mirrors forming a standing wave laser resonator, and wherein the pair of opposed mirrors further comprises a reflecting mirror, and an output mirror, and wherein the laser material is further aligned within the standing wave resonator such that laser light from the laser material will form a standing wave within the standing wave laser resonator.

5. A laser system according to claim 3 wherein the means for producing laser resonance further comprises a ring resonator, wherein the laser material is further positioned within the ring resonator such that laser light from the laser material will resonate within the ring resonator.

6. A laser system according to claim 2 wherein the laser material further comprises Ho:Tm:LuLF and the means for pumping the laser material further comprises a flashlamp.

7. A laser system according to claim 6 wherein the means for producing laser resonance further comprises a pair of opposed mirrors forming a standing wave laser resonator, and wherein the pair of opposed mirrors further comprises a reflecting mirror, and an output mirror, and wherein the laser material is further aligned within the standing wave resonator such that laser light from the laser material will form a standing wave within the standing wave laser resonator.

8. A laser system according to claim 6 wherein the means for producing laser resonance further comprises a ring resonator, wherein the laser material is further positioned within the ring resonator such that laser light from the laser material will resonate within the ring resonator.

9. A laser system according to claim 2 wherein the laser material further comprises Ho:LuLF and the means for pumping the laser material further comprises a plurality of laser diodes with pump wavelength ranging from approximately 1.6 µm to approximately 2.05 µm.

10. A laser system according to claim 9 wherein the means for producing laser resonance further comprises a pair of opposed mirrors forming a standing wave laser resonator, and wherein the pair of opposed mirrors further comprises a reflecting mirror, and an output mirror, and wherein the laser material is further aligned within the standing wave resonator such that laser light from the laser material will form a standing wave within the standing wave laser resonator.

11. A laser system according to claim 9 wherein the means for producing laser resonance further comprises a ring resonator, wherein the laser material is further positioned within the ring resonator such that laser light from the laser material will resonate within the ring resonator.

12. A laser system according to claim 2 wherein the laser material further comprises Ho:LuLF and the means for pumping the laser material further comprises a Co:MgF$_2$ laser.

13. A laser system according to claim 12 wherein the means for producing laser resonance further comprises a pair of opposed mirrors forming a standing wave laser cavity, and wherein the pair of opposed mirrors further comprises a reflecting mirror, and an output mirror, and wherein the laser material is further aligned within the standing wave cavity such that laser light from the laser material will form a standing wave within the standing wave laser cavity.

14. A laser system according to claim 12 wherein the means for producing laser resonance further comprises a ring resonator wherein the laser material is further positioned within the resonator such that laser light from the laser material will resonate within the ring resonator.

15. A laser system according to claim 2 wherein the laser material further comprises Ho:LuLF and the means for pumping the laser material further comprises a Tm laser.

16. A laser system according to claim 15 wherein the means for producing laser resonance further comprises a pair of opposed mirrors forming a standing wave laser cavity, and wherein the pair of opposed mirrors further comprises a reflecting mirror, and an output mirror, and wherein the laser material is further aligned within the standing wave cavity such that laser light from the laser material will form a standing wave within the standing wave laser cavity.

17. A laser system according to claim 15 wherein the means for producing laser resonance further comprises a ring resonator wherein the laser material is further positioned within the resonator such that laser light from the laser material will resonate within the ring resonator.

18. A laser system according to claim 2 wherein the means for pumping the laser material further comprises a continuous wave pump source.

19. A laser system according to claim 2 wherein the means for producing laser resonance further comprises a Q-switch.

20. A laser system according to claim 2 wherein the means for producing laser resonance further comprises tuning elements such that output may be tuned to the vicinity of 2 µm.

21. A laser system according to claim 2 wherein the means for producing laser resonance further comprises a mode locking device for producing short pulses.

* * * * *